United States Patent
Borlaug

(10) Patent No.: US 12,451,970 B2
(45) Date of Patent: Oct. 21, 2025

(54) DYNAMIC MODULATOR BIAS CONTROLLER WITH CONTINUOUS WAVEFORM CHARACTERIZATION VIA TWO OR MORE BIAS POINTS

(71) Applicant: Raytheon Company, Waltham, MA (US)

(72) Inventor: David Byron Borlaug, Harbor City (CA)

(73) Assignee: RAYTHEON COMPANY, Waltham, MA (US)

( * ) Notice: Subject to any disclaimer, the term of this patent is extended or adjusted under 35 U.S.C. 154(b) by 260 days.

(21) Appl. No.: 18/137,005

(22) Filed: Apr. 20, 2023

(65) Prior Publication Data
US 2024/0356653 A1    Oct. 24, 2024

(51) Int. Cl.
H04B 10/54 (2013.01)
G02F 1/21 (2006.01)

(52) U.S. Cl.
CPC ............ *H04B 10/54* (2013.01); *G02F 1/212* (2021.01)

(58) Field of Classification Search
CPC .................................. H04B 10/54; G02F 1/212
USPC ......................................................... 398/186
See application file for complete search history.

(56) References Cited

U.S. PATENT DOCUMENTS

| | | |
|---|---|---|
| 6,687,451 B1 | 2/2004 | Sikora |
| 7,369,290 B1 | 5/2008 | Cox et al. |
| 8,175,465 B2 * | 5/2012 | Wang ............... H04B 10/50575 359/239 |
| 9,158,137 B1 * | 10/2015 | Abbas ................... H04B 10/54 |
| 9,294,200 B2 | 3/2016 | Mak et al. |
| 11,002,992 B2 | 5/2021 | Rohde |

(Continued)

FOREIGN PATENT DOCUMENTS

CN    111064519 A  *  4/2020   ........... H04B 10/505

OTHER PUBLICATIONS

Zhu et al; Bias-Independent Inter-Modulation Method for Simultaneously Measuring Low-Frequency Modulation and Bias Half-Wave Voltages of Mach-Zehnder Modulators; Jan. 2023; photonics sensors, vol. 13. No. 2, pp. 1-7. (Year: 2023).*

(Continued)

*Primary Examiner* — Amritbir K Sandhu
(74) *Attorney, Agent, or Firm* — CANTOR COLBURN LLP

(57) ABSTRACT

A communication system includes a laser that generates a laser light and a modulator that includes a modulation element configured to modulate the laser light with an input signal based on a bias voltage to produce an output signal. Control circuitry provides the bias voltage to a bias input of the modulation element and is configured to maintain a bias lock on at least two bias points of the modulation element during operation. The control circuitry is programmed to perform a bias lock operation that includes performing an initial voltage sweep on the modulation element and establish initial bias values for the at least two bias points. The circuit also providing a bias waveform to the bias input of the modulation element that varies over time and contains identifiable dither tones, determines harmonic power at the at least two bias points; and varies the bias waveform to determine harmonic power until the harmonic power is minimized to establish a bias lock with locked bias values.

17 Claims, 8 Drawing Sheets

(56) References Cited

U.S. PATENT DOCUMENTS

| | | | |
|---|---|---|---|
| 11,604,369 B2* | 3/2023 | Takechi | G02F 1/0123 |
| 11,888,526 B2* | 1/2024 | Murakami | G02F 1/0123 |
| 12,009,864 B2* | 6/2024 | Wu | H04B 10/50575 |
| 2014/0016172 A1* | 1/2014 | Khatana | G02F 1/0123 |
| | | | 359/239 |
| 2017/0357110 A1 | 12/2017 | Liu et al. | |
| 2018/0173023 A1* | 6/2018 | Streshinsky | G02F 1/2255 |
| 2018/0267340 A1* | 9/2018 | Rohde | G02F 1/225 |
| 2018/0269980 A1* | 9/2018 | Koga | H04B 10/541 |
| 2019/0324298 A1* | 10/2019 | Dayel | G02F 1/0147 |
| 2021/0211202 A1 | 7/2021 | Tsai et al. | |

OTHER PUBLICATIONS

Notification of Transmittal of the International Search Report and the Written Opinion of the International Searching Authority, or the Declaration; PCT/US2024/023539; Jul. 8, 2024, 14 pages.

Xblue, Introduction to iXBlue Mach-Zehnder Modulators Bias Controllers, Fiber Optics, Laser Components, Dec. 2022 / V03 / IF / lc/application-reports/ixblue/introduction-to-modulator-bias-controllers [retrieved on Jan. 31, 2023 (Jan. 31, 2023)]. Retrieved from the internet:, URL: https://www.lasercomponents.com/de/?embedded=1&file=fileadmin/user_upload/home/Datasheets/lc/application-reports/ixblue/introduction-to-modulator-bias-controllers.pdf&no_cache=1.

* cited by examiner

DYNAMIC MODULATOR BIAS CONTROLLER WITH CONTINUOUS WAVEFORM CHARACTERIZATION VIA TWO OR MORE BIAS POINTS

BACKGROUND

The disclosure relates generally to signal processing systems, and more particularly, a modulator bias controller that tracks multiple bias points.

Many optical signals include phase modulation formats, as well as amplitude and other modulation formats. One type of known optical waveguide modulators used in high-speed optical communications are known as Mach-Zehnder (MZ) interferometric structures or MZ modulators. In short, MZ modulators utilize an input optical carrier signal that is modulated with an RF communications signal.

In more detail, a generalized MZ modulator includes input waveguide that is split into two different paths and then recombined to produce an output. The light will experience phase shifts in each branch. A high-frequency (e.g., Radio Frequency (RF)) signal can be applied to one of the arms. This will change the optical path lengths between the two arms and result in a phase modulated output signal.

Such systems will typically operate at one of four possible bias points that are defined on the power transfer curve/function of the modulator. These points are typically referred to as positive quadrature (Qp), negative quadrature (Qn), Null (N), and peak (P). In general, the bias point is selected and maintained by application of a DC bias applied to at least one of the arm. This bias is most often selected depending on the desired operation. Without being bound by theory, the skilled artisan will realize that some types of operation may preferably operate at the null/peak bias points. For example, a duo-binary MZM, optical performance is optimized when the MZM operates at a null point. In other case it may be preferable to operate in the linear regions of the transfer function and, thus, the modulator will be biased to one of the quadrature points Qp, Qn.

Mach-Zehder modulator can, however, include imbalances. The imbalance can arise small difference between the two optical paths due to material inhomogeneity, manufacturing tolerances. Further, the modulator may be subject to drift over time. This drift can be caused by, for example thermal changes, thermal inhomogeneity, aging, photo refractive effects, static electrical charge accumulation. To account for drift, a DC bias voltage may need to be tracked and adjusted. Existing commercial modulator bias controllers are able to establish a bias lock at only one bias point at a time.

SUMMARY

According to a non-limiting embodiment, a communication system is disclosed. The system includes a laser that generates a laser light, a modulator that includes a modulation element configured to modulate the laser light with an input signal based on a bias voltage to produce an output signal and control circuitry that provides the bias voltage to a bias input of the modulation element The system also includes a signal splitter that receives the output signal and provides the output signal to an output of the system and to the control circuitry. The control circuitry is configured to maintain a bias lock on at least two bias points of the modulation element during operation and is programmed to perform a bias lock operation. The bias lock operation includes: performing an initial voltage sweep on the modulation element by ramping the bias voltage from a minimum value to a maximum and recording results of the initial sweep based on the output signal; establishing initial bias values for the at least two bias points by examining the results; providing a bias waveform to the bias input of the modulation element that varies over time and contains identifiable dither tones; determining harmonic power at the at least two bias points; and varying the bias waveform to determine harmonic power until the harmonic power is minimized to establish a bias lock with locked bias values.

In any prior embodiment, the control circuitry can include a photodiode, an analog to digital converter (ADC) and a digital signal processor (DSP).

In any prior embodiment, the signal splitter can be connected to the photodiode and provide the output to the photodiode.

In any prior embodiment, the photodiode can convert the output to an analog signal and provides the analog signal to the ADC.

In any prior embodiment, the ADC can be connected to DSP, convert the analog signal to a digital signal and provide the digital signal to the DSP.

In any prior embodiment, the DSP can determine harmonic power of a second harmonic of the two or more bias points when either are quadrature positive (Qp) or a quadrature negative (Qn) bias point.

In any prior embodiment, the DSP can determine harmonic power of a third harmonic of the two or more bias points when are either a peak or null bias point.

In any prior embodiment, the system can also include a digital to analog converter (DAC) connected between the DSP and the bias input of the modulation element.

In any prior embodiment, the control circuitry can be further programmed to add a dither signal to the bias signal at each locked bias value.

In any prior embodiment, the control circuitry can be further programmed to reduce an amplitude of the dither signal to reduce signal to noise ratio of the harmonic power.

Also disclosed is method of operating a communication system. The method can be applied to any system above or that is otherwise disclosed herein. In one embodiment the method includes: providing with control circuitry the bias voltage to a bias input of the modulation element; splitting the output signal and providing the output signal to an output of the system and to the control circuitry; maintaining a bias lock on at least two bias points of the modulation element during operation with the control circuitry. Maintaining can include: performing an initial voltage sweep on the modulation element by ramping the bias voltage from a minimum value to a maximum and recording results of the initial voltage sweep based on the output signal; establishing initial bias values for the at least two bias point by examining the results; providing a bias locking signal to the bias input of the modulation element that varies sequentially over each of the initial bias values over time; determining harmonic power at the initial bias values; varying the biasing signal around the initial vias values; and determining harmonic power until the harmonic power is minimized to establish a locked bias signal with lock bias values.

In any prior method, the method can further include adding a dither signal to the bias signal at each locked bias value.

In any prior method, the method can further include reducing an amplitude of the dither signal to reduce signal to noise ratio of the harmonic power.

Figure 4A:
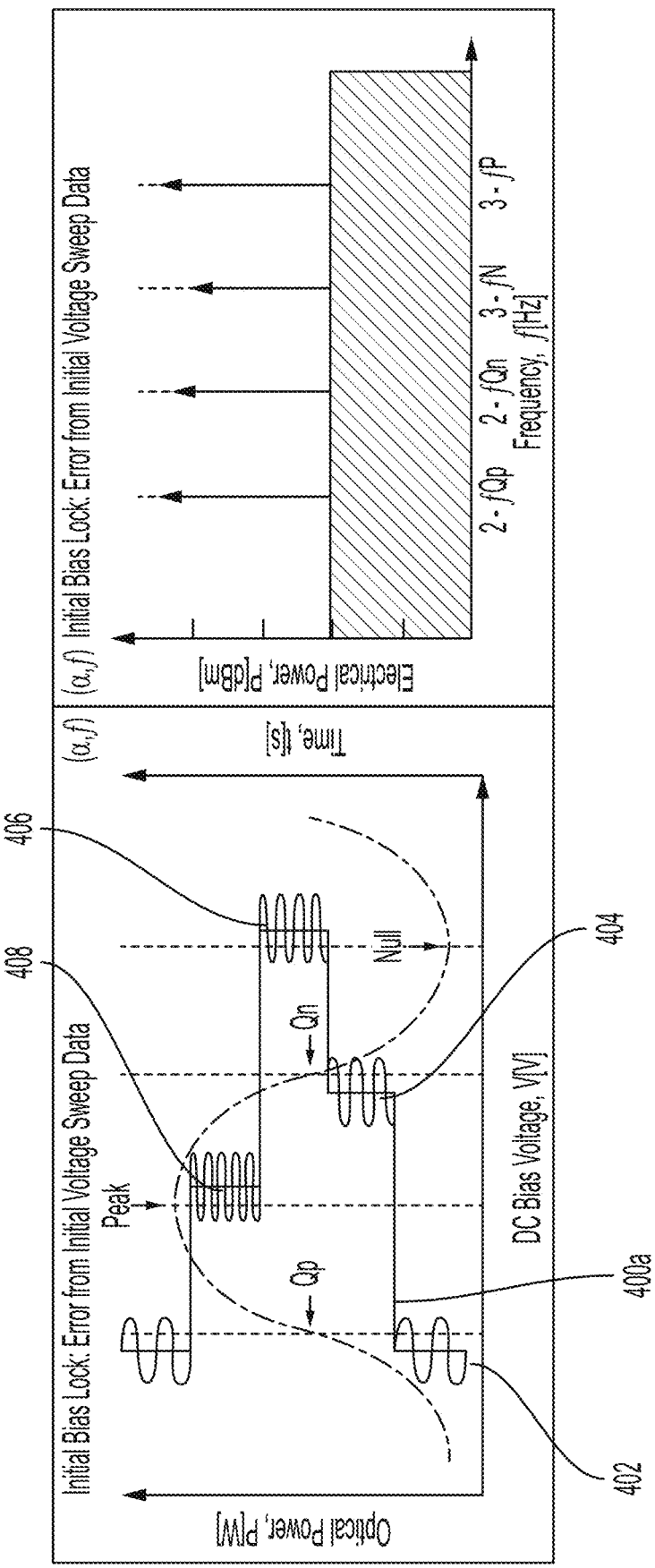
FIG. 4a shows error that can exist based on an initial bias lock sweep.
Figure 4B:
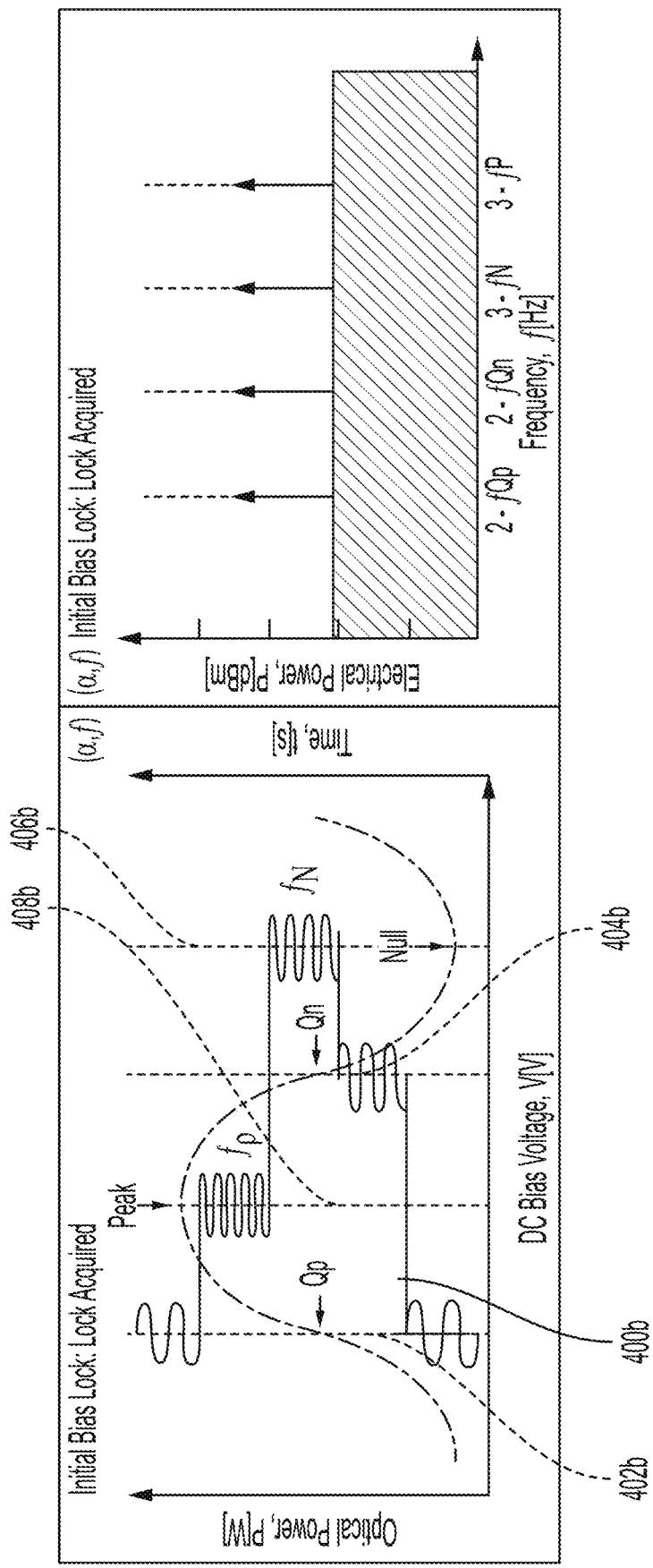
Figure 4C:
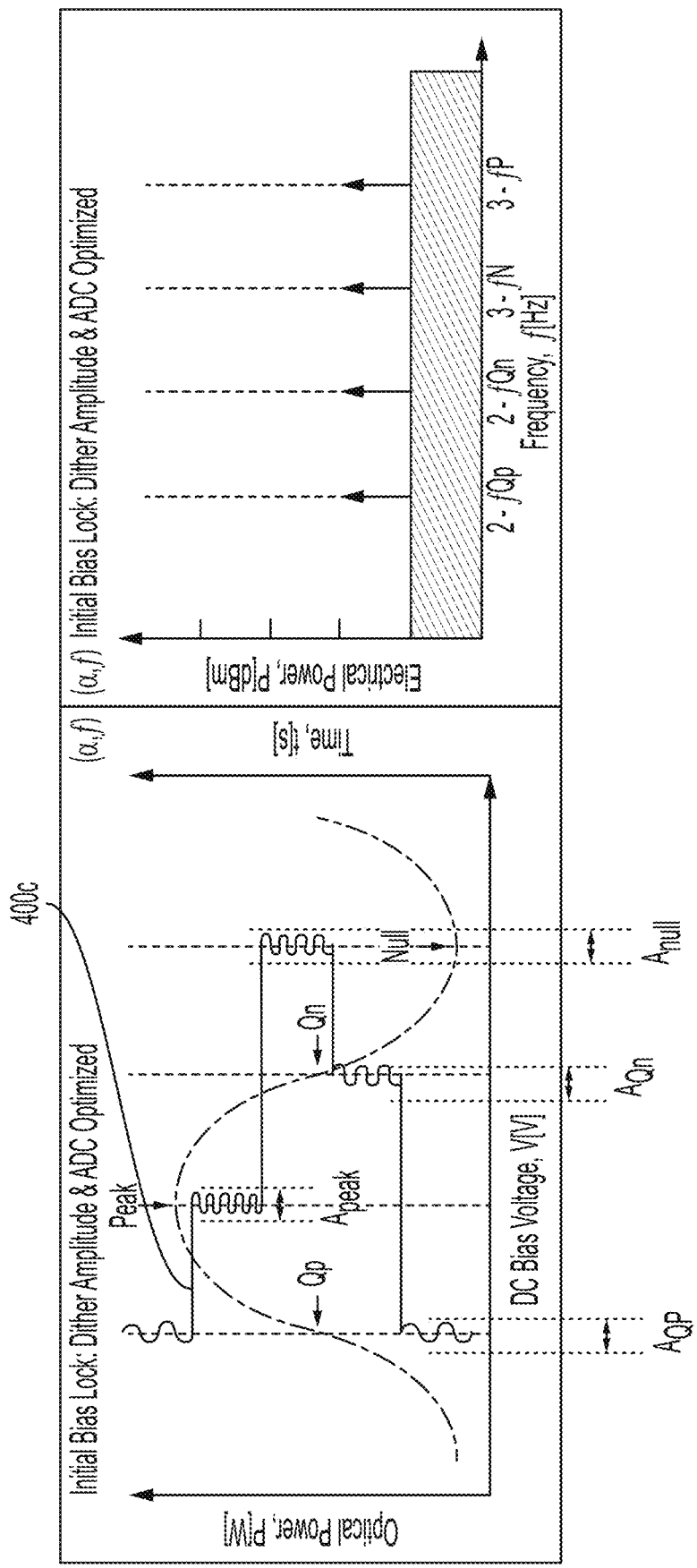
Figure 4D:
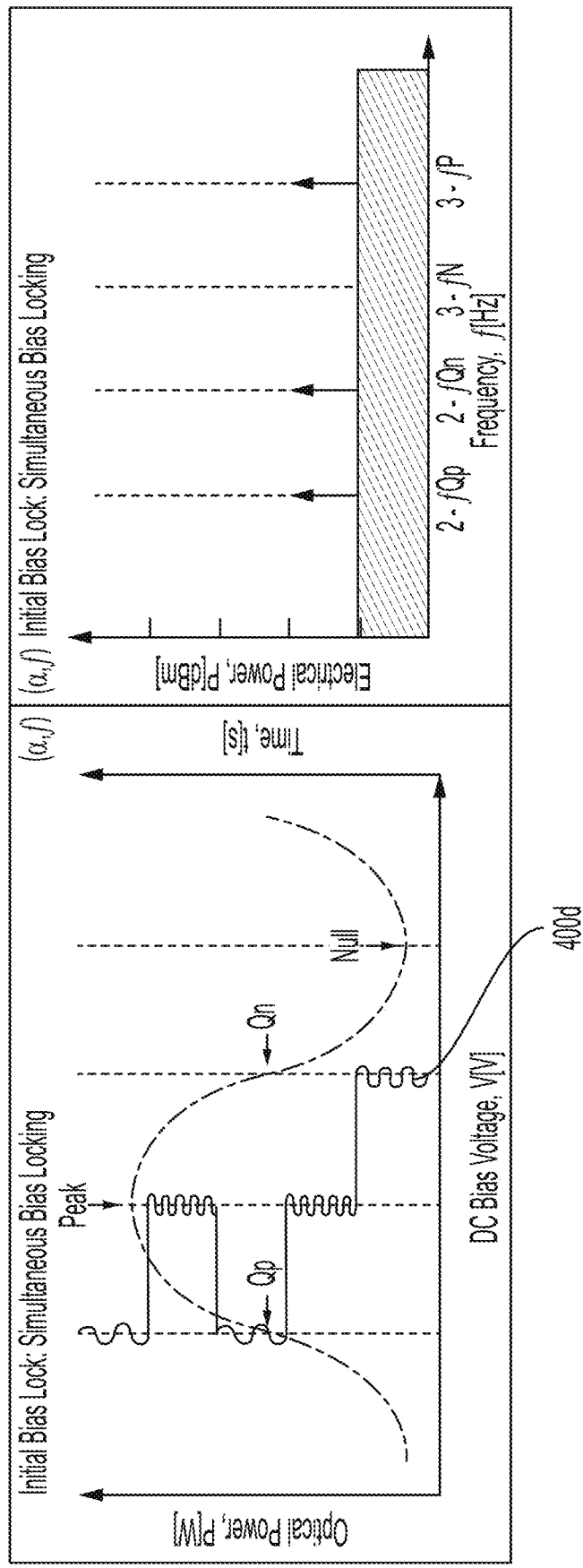

attained;

FIG. 4b after initial bias lock has occurred;

FIG. 4c shows has dither can be utilized to optimize the lock;

FIG. 4d shows the normal operation with bias lock; and

Figure 5:
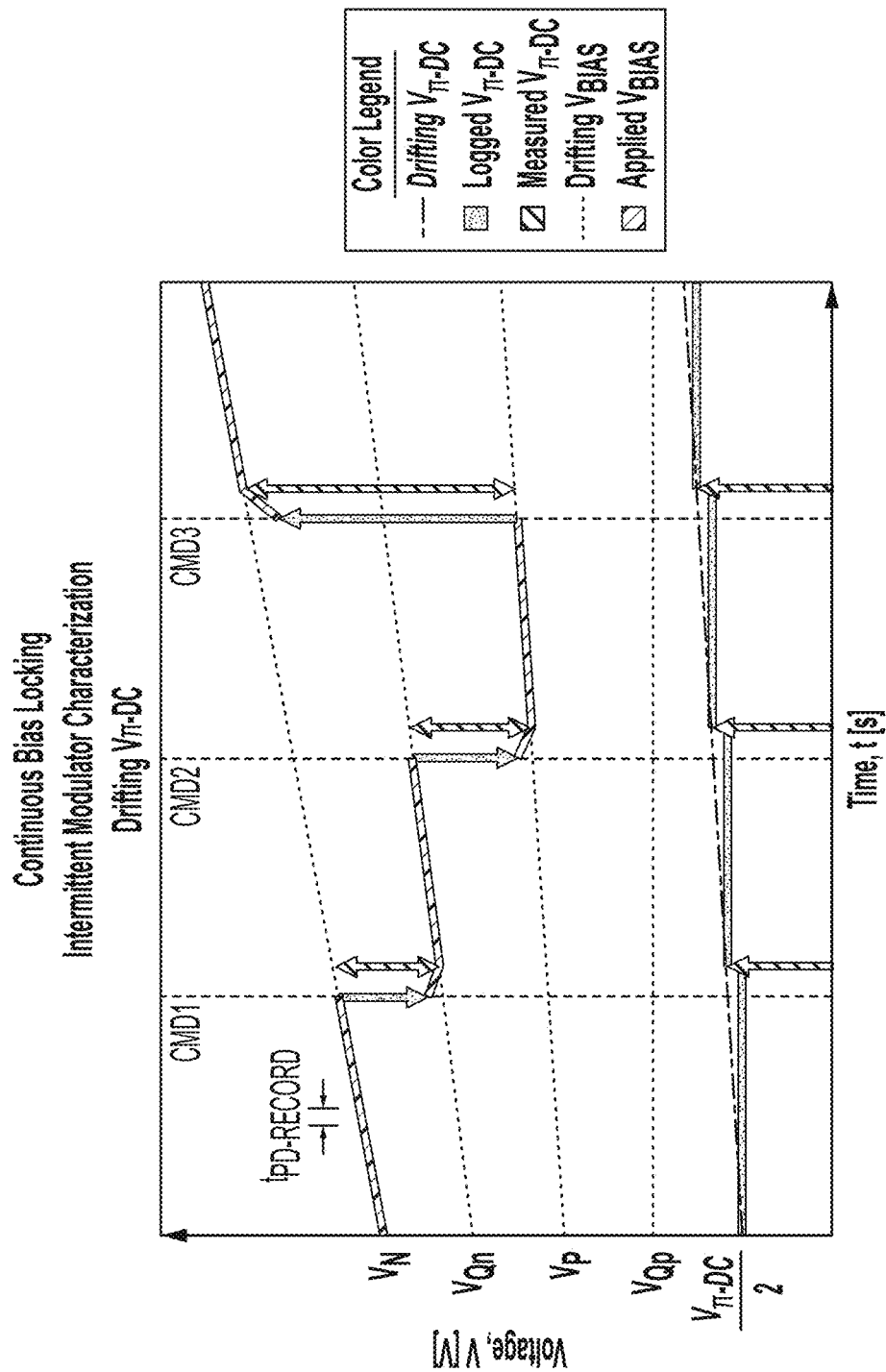

FIG. 5 shows locking with drift.

DETAILED DESCRIPTION

As noted above, existing systems can track one bias point and, thus, adjust the bias voltage. However, while existing commercial bias controllers are bias locked, they are completely unaware of the other three bias points. To switch from one bias point to another, existing commercial modulator bias controllers must perform a search to find the newly commanded bias point.

During this search time, which can be considerable in duration, the data stream is corrupted. Additionally, successful locking of the newly commanded bias point is not guaranteed by existing commercial bias controller, which can result in unpredictable system behavior.

Disclosed herein is system that may overcome the above limitation by simultaneously tracking two or more (and in some cases, all four) bias points, simultaneously and continuously.

Embodiments can be commanded by application software to operate at any of the four bias points at will, switching rapidly between several points, or infrequently, as required by the application. This can be advantageous, for example, in systems that require frequent switching between multiple bias points. Additionally, one or more embodiments can operate similarly to existing commercial modulator bias controllers, where a single bias point is selected indefinitely.

Figure 1:
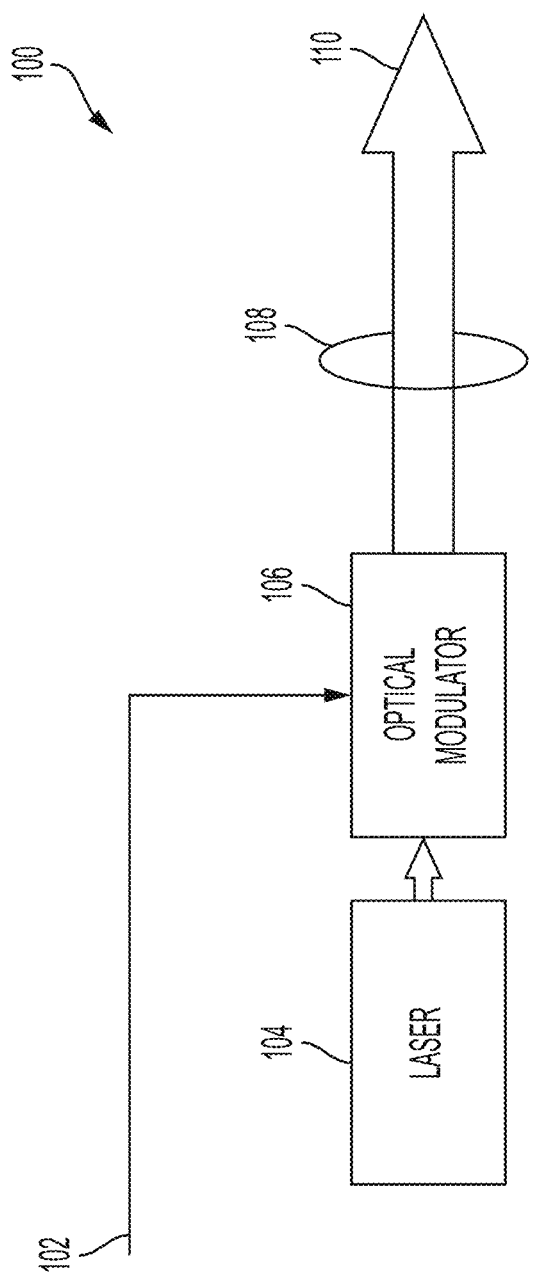
FIG. 1 illustrates a block diagram of a low frequency phase detection system according to a non-limiting embodiment.

FIG. 1 shows a system in the form of an optical transmitter 100 according to one embodiment. FIG. 1 shows the optical transmitter (or system) 100 as a functional block diagram.

The example optical transmitter 100 shown in FIG. 1 may be shown and described as discrete elements in a block diagram, and may be referred to as "system", "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 may be implemented as discrete analog, digital, or optical signal lines. Some of the processing operations may be expressed in terms of calculations or determinations by the optical transmitter 100. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, an optical source (e.g., a laser) 104, a modulator 106, and optics 108, and an output 110 to provide an optical signal output. The modulator 106 imposes a modulation scheme on light from the optical source 104 to generate a modulated optical signal. In various examples, the modulator 106 may be an electro-optic modulator, and may include the optical source 104, such as a laser that generates laser light. In particular, the optical source 104 may emit a continuous carrier waveform that is modulated (e.g., in phase, amplitude, and/or frequency) for each symbol of the data payload to encode those symbols on the carrier waveform. The transmitter 100 may also include various optics 108 such as one or more mirrors or lenses to direct the optical signal at the output 110. Herein, the output 110 is referred to as SigOut 110.

Figure 2:
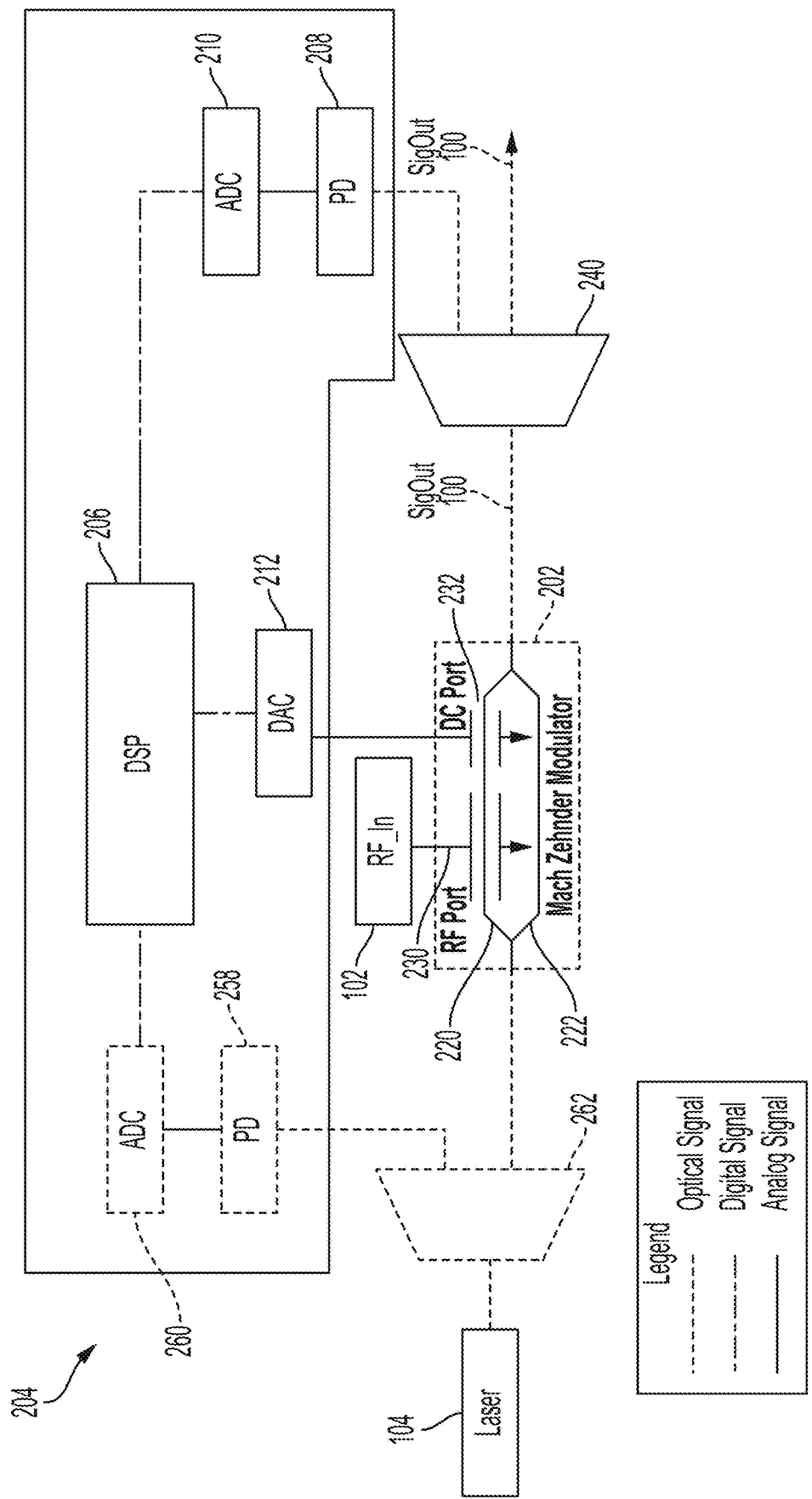
FIG. 2 illustrates a functional block diagram of a high frequency phase detection system according to a non-limiting embodiment.

FIG. 2 shows a more detailed version of a modulator 106 according to one embodiment. In combination with the laser, the modulator 106 can be referred to as a high frequency communication system and it receives, for example, a data payload 102 either form the system itself or from an external device that has "message" that is to be sent with the modulator 106.

In FIG. 2 circuit connections between elements are shown by different line types as identified by the legend in FIG. 2 to represent different signal types being carried. The configuration of the elements of FIG. 2 may be utilized in any embodiment disclosed herein. This embodiment may utilize a dithering technique in tracking the bias points. In other embodiments, the system may operate without dithering and may include, for example, additional photo diodes/ACD's.

The modulator 106 can include a modulation element 202 and control circuitry 204. In this example, the control circuitry 204 can includes a digital signal processor 206. The control circuit 204, generally, receives an output of the modulation element 202 and can vary the DC bias provided to the modulation element 202 based on the received output. In this example, the modulation element 202 is an MZ modulator that includes first and second paths 220, 222. The modulation element 202 in FIG. 2 is simplified for ease of explanation and the first path includes both the RF input port 230 and the DC bias input port 232.

As shown in FIG. 2, the input 102 provides an analog RF input signal (RF_In) to the modulation element 202 at RF input port 230. This RF signal modulates the phase of the light in the first path 220. When the two paths 220, 222 the changes to the signal in the first path 220 will be slightly modified and, thus, interfere with the signal in the second path 222 in a known manner to create and output light signal that carriers the RF_In information. This signal is shown a SigOut 110 in FIG. 2.

The modulation element 202 receives a bias input at the DC bias input port 232. The value of that bias was typically set based on single bias point. The system herein can track and, thus, switch, between two or more bias points. In one embodiment, all four bias points (as positive quadrature (Qp), negative quadrature (Qn), null (N), and peak (P)) can be tracked. These points are shown FIG. 3 for reference. It is noted that operating at the Qp and Qn point can provide the most linearity. However, there are other times where N and P can be beneficial for carrier suppression, millimeter wave applications, fundamental physics, and a broad array of other application.

The disclosed system/methods, as more fully disclosed below, can allow for rapidly switching between two or more bias operating points and continuously maintaining bias lock at all operating points. This may be done without having recalibrate or otherwise performing a voltage sweep to establish a lock at the new bias point. Further, embodiments can allow for rapidly switch between 2 or more bias operating points and continuously characterize the modulator's complete response. In addition, embodiments disclosed herein can be intermittently commanded from a single bias operating point directly to another single bias operating point.

Figure 3:
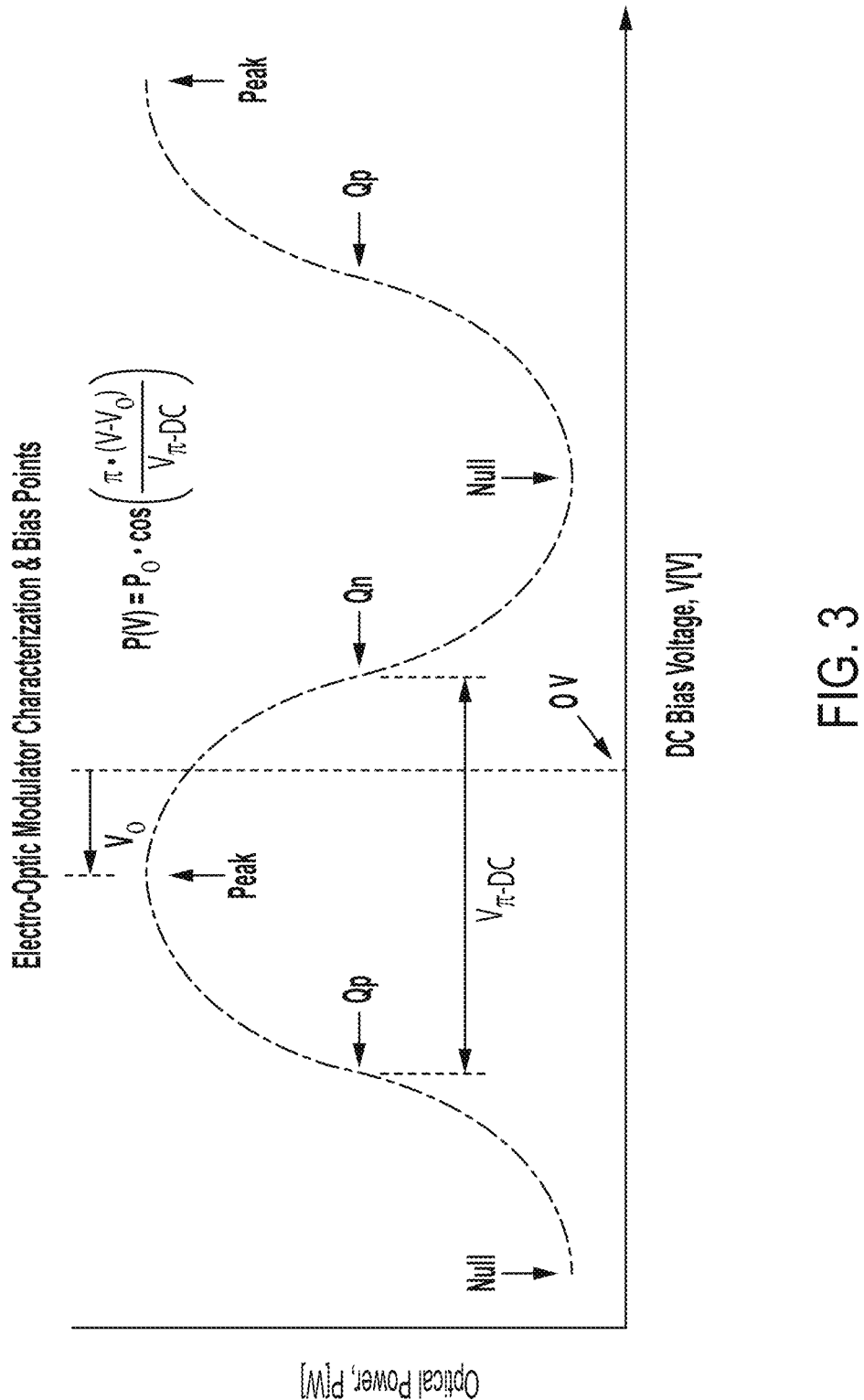
FIG. 3 shows certain parameters that are tracked and/or optimized according to embodiments.

With further reference to FIG. 3, consider that case of modulation element 202 as shown in FIG. 2. For a given voltage range for the DC output (e.g., −5V to 5V) the output signal SigOut 110 will be produced. In an ideal world, the peak would occur at 0V but defects may shift by a distance shown as $V_0$ in FIG. 3. The will cause the output curve to deviate from a cos wave by $V_0$ and, thus, is subtracted from Vin in the transfer function of the modulation element 202. The DC power transfer function can thus be represented as:

$$P(V) = P_0 \cdot \cos\left(\frac{\pi \cdot (V - V_0)}{V_{\pi-DC}}\right) \quad (1)$$

wherein $P_0$ equals offset in power, $V_0$ is the change in bias voltage needed to move the peak to the 0V location, and $V_{\pi-DC}$ is the distance between Qp and Qn as shown in FIG. 3 and it related to the switching efficiency to the DC port 232

Assuming that the bias is correct (locked) the modulation element 202 will work as expected and the output signal SigOut 110 can be optimal. To ensure that that two or more of the bias points are being tracked and are locked, the system of FIG. 2 includes control circuitry 204. The circuitry 204 can track the bias points and correct as needed. The correction can be manifested in changes in the DC voltage provided to the DC port 232 of the modulation element 202.

The system of FIG. 2 can include a signal splitter 240 that receives SigOut 110 and provides two versions of it at its output. The first version is provided to (as shown in FIG. 1) to optics 108 to direct the optical signal at the output 110.

The second version is provided to the control circuitry 204. In particular, the light signal SigOut 110 is provided to photodiode 208 where the light signal is converted to an electrical signal (e.g., current or voltage). This electrical signal is then converted from analog to digital format by an analog to digital converter 210. This ADC provides a digital representation of the light signal (SigOut 110) to a digital signal processor (DSP) 206. The DSP can include memory and other circuits that allow it track the bias point and to create a digital output that represent a desired DC bias voltage. This digital output can be converted to an analog output by a digital to analog converter (DAC) 212 and then provided as the bias voltage provided to the DC port 232. As shown in FIG. 2 various direct connections are shown between elements. It shall be understood that indirect connections could be made if tuning/scaling is needed.

Optionally, to allow for ditherless bias control, the system of FIG. 2 can include a second signal splitter 262 that receives the laser signal and provides two versions of it at its output. The first version is provided to the modulation element 202. The second version is provided to the control circuitry 204. In particular, the light signal is provided to a second photodiode 258 where the light signal is converted to an electrical signal (e.g., current or voltage). This electrical signal is then converted from analog to digital format by an analog to second digital converter 260 that is provided to the digital signal processor (DSP) 206. Ditherless bias control operates by maintaining the power ratio between photodiode 258 and 208.

The DSP 206 can be configured to operate on the information it receives to achieve the desired DC offset voltage at the DC port 232. In short, based upon the digitized photodiode signal (output of photodiode 208) and DSP 206 operations, the waveform output by the DAC 212 is changed to simultaneously maintain lock on two or more (or all four) bias positions.

The bias control operation consists of an initial voltage sweep, followed by an initial bias lock, followed by continuous bias locking and acceptance of dynamic application commands. The warm-up period is complete and the system is operational following completion of the initial bias lock.

In more detail and with reference to FIGS. 2-4, The DSP 206 causes the DAC 212 to preform in a voltage sweep. The voltage sweep can sweep the voltage from, for example, −5 to 5V but other ranges can be utilized based on the operating parameters of the modulation element 202. In one embodiment, the output voltage is swept over the maximum permissible range of the modulator's DC port. Based on this initial sweep, the initial values of the values noted in FIG. 3 can be recorded. These values can be determined, for example, by modules within the DSP 206. It is noted, however, the values may not be exact and improvement may be needed. As shown in FIG. 4a, the initially determined values are in waveform 400a and are determined to be the values identified by lines 402, 404, 406 and 408. These values can also be referred to as initial values of $V_{Qp}$, $V_{Qn}$, $V_{Null}$, and $V_{Peak}$. These initial values represent the baseline value for the oscillating signals around which the dither signal (oscillations in FIG. 4a) is added and described further below. It shall be noted that an example fast Fourier transform (FFT) at the bias points is shown for explanation. This FFT can be by the FFT based on the output of photodiode. The FFT can be a discreet FFT in one embodiment.

The DC bias signal 400 is provided that sequentially moves from the 402, 404, 406 and 408. That it, it moves in the order for the initial value of Qp, to the initial value of Qn, to the initial value of the Null to the initial value of Peak. This order could be changed without departing from the disclosure herein.

Of interest for each bias points are the harmonics produced at each of the points 402, 404, 406 and 408. Of particular interest are the second harmonics for the Qn and Qp ($2f_{qn}$ and $2f_{qp}$) and the third harmonics for the Null and Peak ($3f_n$ and $3f_p$). This selection is based on the small signal Taylor expansion of the modulators cosine transfer function about the linear bias points Qp and Qn (where optimal locking extinguishes the second harmonic), and the quadratic bias points Null and Peak (where optimal locking extinguishes the third harmonic).

As shown in FIG. 4b, for each bias point a dither tone is added onto the initial bias points. For example, the Qp bias waveform is:

$$V(t) = V_{Qp} + A_{Qp} \cdot \sin(2\pi f_{Qp} t)$$

wherein $V_{Qp}$ is the initial bias point, $A_{Qp}$ is the amplitude of the dither tone and fop is the frequency of the dither tone. Further, for the peak and null bias points, V(t) is similar but a cosine function is used. It should be noted that in all of the bias signals 400, the dither is shown but the skilled artisan will realize that it can be omitted form signals 400.

Bias locking is accomplished by adjusting the initial bias voltages V_Qp, V_Qn, V_P, and V_N until their associated photo-detected harmonics at frequencies $2f_{qn}$, $2f_{qp}$, $3f_n$, $3f_p$ are minimized. It shall be understood that bias locking is achieved by minimizing the relevant harmonic frequency's power by adjusting the relevant voltage. In one embodiment, bias locking can be accomplished at one operating point only, using one frequency only. In another embodiment, all four are minimized simultaneously. Embodiments minimizing the harmonics of 2 or 3 harmonics are also manifested.

Initial bias locking has been accomplished when modifying the initial bias values $V_{QP}$, $V_{QN}$, $V_{null}$, and $V_{peak}$ only increases the harmonic power. This is shown in FIG. 4b. In FIG. 4b the corrected/locked values are shown and identified by reference numerals 402b, 404b, 406b and 408b. It shall be understood that this process can include locating a DAC output value (e.g., DC bias voltage) where increasing and decreasing the DC bias voltage results in increase of the harmonic power.

Thus, this step can include moving the locations of initially determined values 402, 404, 406 and 408 until the above condition is reached and is indicated by locked bias voltage 400b. For example, if the initial value for the Qp value 402 was 2V, the value could be increased to 2.1V. Then the harmonics could be examined as discussed FIGS. 4a and 4b. Then, the value could be incremented (e.g., to 2.11V) and the harmonics compared. If the harmonics increased, then the next value could be a reduced value (e.g., 2.09V). This value can then be decreased until the harmonics stop decreasing. Then a final check can be made in the same manner until movement of the DC bias in either direction results in an increase in harmonic power. The resultant values can be part of a locked bias signal 400b shown in FIG. 4b.

Next the lock can be optimized. This can include one or both of reducing noise floor and the amplitude of the dither tones to reduce the SNR. In more detail, such an optimization can include, while maintaining bias locking (e.g., via signal 400c), adjusting parameters $t_{PD\text{-}RECORD}$ of the ADC 210 and the sample rate $f_{PD\text{-}SMPL}$ of the ADC 210 to reduce the noise floor of the spectral trace containing the harmonic tones produced in DSP 206. Effort should be made to ensure the duration of the time-series recording of the photodiode voltage, given by $t_{PD\text{-}RECORD}$, is an integer multiple (1 to n) of the time series duration of the bias waveform produced by the DAC 212.

In some embodiments, the system can dynamically adjust record length $t_{PD\text{-}RECORD}$ and ADC sample rate $f_{PD\text{-}SMPL}$ to minimize excess injection of the bias control waveform in to SigOut 110.

Further, the dither amplitudes $A_{QP}$, $A_{QN}$, $A_{null}$, and $A_{peak}$ are reduced until the signal-to-noise ratio (SNR) of the respective harmonics equals a target value as shown in FIG. 4c with signal 400c.

In some embodiments can dynamically adjust dither amplitude ($A_{Qp}$, $A_{Qn}$, $A_N$, $A_P$) to minimize excess injection of the bias control waveform in to SigOut 110.

As will be appreciated by a skilled artisan, by knowing two of the bias points at all times, the modulator's DC response parameters V_pi-DC and V_0 can be calculated, and the response to a DC voltage sweep can be known. Thus, the applied bias tracking waveform can achieve modulator characterization by tracking only two of the bias points. In FIG. 4d an example shows 3 bias points being tracked with signal 400d, in this case, Qp, Qn, and Peak. Other values could also be tracked instead. Further, if the bias point were to be changed, for example to Null, that value is already known.

In the system and methods disclosed herein, continuous modulator characterization requires a repeating sequence of 2 or more bias operating points which completes 1 or more times every $t_{PD\text{-}RECORD}$.

Intermittent modulator characterization is performed whenever the requirements for continuous characterization are not met. Therefore, intermittent modulator characterization is performed for: (1) command sequences where $t_{PD\text{-}RECORD} < t_{SEQ}$ and (2) for single bias operating point commands. In all cases, the bias operating point is continuously locked.

Continuous modulator characterization captures the modulator's entire DC bias response function every $t_{PD\text{-}RECORD}$. This is done by directly measuring $V_{\pi\text{-}DC}$ and $V_0$ over the course of one photodiode record, without sweeping the modulator's voltage. $V_{\pi\text{-}DC}$ and $V_0$ are calculated using the known relationships between two or more locked bias voltages $V_{QP}$, $V_{QN}$, $V_{null}$, and $V_{peak}$.

Intermittent modulator characterization captures the modulator's entire DC bias response function, once every time the bias operating point changes. This is done by directly measuring $V_{\pi\text{-}DC}$ and $V_0$ over the course of several photodiode records, without sweeping the modulator's voltage. VI-DC and $V_0$ are calculated using the known relationships between two or more locked bias voltages $V_{QP}$, $V_{QN}$, $V_{null}$, and $V_{peak}$.

From the above discussion, it shall be understood that embodiments herein may be able to maintaining bias lock indefinitely at one of four bias operating point. However, in contrast the prior art, embodiments herein can track two or more operating points simultaneously and thus, can rapidly switch between 2 or more bias operating points and continuously may maintain bias lock at all operating points. This is done without performing a voltage sweep or losing bias lock.

By tracking at least two of the points (and possibly all four) embodiments disclosed herein can rapidly switch between 2 or more bias operating points and continuously characterize the modulator's complete response. This is done without performing a voltage sweep or losing bias lock.

Embodiments may be able to be intermittently commanded from a single bias operating point directly to another single bias operating point. The transition from one bias operating point to the other is accomplished without performing a voltage sweep.

For continuous modulator characterization conditions, the transition from one bias operating point directly to the other is accomplished without losing bias lock. The transition from one bias operating point to the other is accomplished without performing a voltage sweep.

For intermittent modulator characterization conditions, and for modulators that do not experience $V_{\pi\text{-}DC}$ drift, the transition from one bias operating point directly to the other is accomplished without losing bias lock. The transition from one bias operating point to the other is accomplished without performing a voltage sweep.

For intermittent modulator characterization conditions, and for modulators that do experience $V_{\pi\text{-}DC}$ drift, the transition from one bias operating point directly to the other introduces a voltage error proportional to the $V_{\pi\text{-}DC}$ drift, which is small, after which bias lock is quickly established, see FIG. 5. The transition from one bias operating point to the other is accomplished without performing a voltage sweep.

Embodiments may be able to determine the characteristic drift time ($t_{DRIFT}$) over which the modulator's bias voltage drifts. This can be accomplished because two or more points are simultaneously tracked and logged in DSP 206.

As used herein, the term "module" refers to an application specific integrated circuit (ASIC), an electronic circuit, a computer processor (shared, dedicated, or group) and memory that executes one or more software or firmware programs, a combinational logic circuit, a microcontroller including various inputs and outputs, and/or other suitable components that provide the described functionality. When implemented in software, a module can be embodied in memory as a non-transitory machine-readable storage medium readable by a processing circuit (e.g., a microprocessor) and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A communication system comprising:
    a laser that generates a laser light;
    a modulator that includes a modulation element configured to modulate the laser light with an input signal based on a bias voltage to produce an output signal;
    control circuitry that provides the bias voltage to a bias input of the modulation element; and
    a signal splitter that receives the output signal and provides the output signal to an output of the system and to the control circuitry;
    wherein the control circuitry is configured to maintain a bias lock on at least two bias points of the modulation element during operation and is programmed to perform a bias lock operation that includes:
        performing an initial voltage sweep on the modulation element by ramping the bias voltage from a minimum value to a maximum and recording results of the initial sweep based on the output signal;
        establishing initial bias values for the at least two bias points by examining the results;
        providing a bias waveform to the bias input of the modulation element that varies over time and contains at least two identifiable and different dither tones, one for each of the at least two bias points;
        determining harmonic power at the at least two bias points; and
        varying the bias waveform to determine harmonic power until the harmonic power is minimized to establish a bias lock with locked bias values.

2. The system of claim 1, wherein the control circuitry includes a photodiode, an analog to digital converter (ADC) and a digital signal processor (DSP).

3. The system of claim 2, wherein the signal splitter is connected to the photodiode and provides the output to the photodiode and the photodiode converts the output to an analog signal and provides the analog signal to the ADC.

4. The system of claim 3, wherein the ADC is connected to DSP and converts the analog signal to a digital signal and provides the digital signal to the DSP.

5. The system of claim 4, wherein DSP determines harmonic power of a second harmonic of the two or more bias points when either are quadrature positive (Qp) or a quadrature negative (Qn) bias point.

6. The system of claim 4, wherein DSP determines harmonic power of a third harmonic of the two or more bias points when are either a peak or null bias point.

7. The system of claim 6, further comprising a digital to analog converter (DAC) connected between the DSP and the bias input of the modulation element.

8. The system of claim 1, wherein the control circuitry is further programmed to add a dither signal to the bias signal at each locked bias value.

9. The system of claim 8, wherein the control circuitry is further programmed to reduce an amplitude of the dither signal to reduce signal to noise ratio of the harmonic power.

10. A method of operating a communication system that includes a laser that generates a laser light and a modulator that includes a modulation element configured to modulate the laser light with a data signal and a bias signal to produce an output signal, the method comprising:
    providing with control circuitry the bias voltage to a bias input of the modulation element;
    splitting the output signal and providing the output signal to an output of the system and to the control circuitry;
    maintaining a bias lock on at least two bias points of the modulation element during operation with the control circuitry, wherein maintaining includes:
        performing an initial voltage sweep on the modulation element by ramping the bias voltage from a minimum value to a maximum and recording results of the initial voltage sweep based on the output signal;
        establishing initial bias values for the at least two bias point by examining the results;
        providing a bias locking signal to the bias input of the modulation element that varies sequentially over each of the initial bias values over time, wherein the signal includes a dither tone for each of the at least two points that is uniquely identifiable;
        determining harmonic power at the initial bias values; and
        varying the biasing signal around the initial bias values; and
        determining harmonic power until the harmonic power is minimized to establish a locked bias signal with locked bias values.

11. The method of claim 10, wherein the control circuitry includes a photodiode, an analog to digital converter (ADC) and a digital signal processor (DSP).

12. The method of claim 11, wherein the signal splitter is connected to the photodiode and provides the output to the photodiode and the photodiode converts the output to an analog signal and provides the analog signal to the ADC.

13. The method of claim 12, wherein the ADC is connected to the DSP and converts the analog signal to a digital signal and provides the digital signal to the DSP.

14. The method of claim 13, wherein DSP determines harmonic power of a second harmonic of the two or more bias points when either are a quadrature positive (Qp) or a quadrature negative (Qn) bias point.

15. The method of claim 14, wherein DSP determines harmonic power of a third harmonic of the two or more bias points when either are a peak or null bias point.

16. The method of claim 10, further comprising adding a dither signal to the bias signal at each locked bias value.

17. The method of claim 16, further comprising:
reducing an amplitude of the dither signal to reduce signal to noise ratio of the harmonic power.

\* \* \* \* \*